United States Patent [19]
Doi et al.

[11] Patent Number: 5,351,189
[45] Date of Patent: Sep. 27, 1994

[54] MACHINE TRANSLATION SYSTEM INCLUDING SEPARATED SIDE-BY-SIDE DISPLAY OF ORIGINAL AND CORRESPONDING TRANSLATED SENTENCES

[75] Inventors: Miwako Doi, Kawasaki; Shin-ya Amano, Yokohama; Seiji Miike, Yokohama; Hiroyasu Nogami, Yokohama; Akira Kumano, Yokohama; Kimihito Takeda, Odawara; Hisahiro Adachi, Chigasaki; Isamu Iwai, Kawasaki; Toshio Okamoto, Tokyo; Noriko Yamanaka, Fujisawa; Tsutomu Kawada, Yokohama, all of Japan

[73] Assignee: Kabushiki Kaisha Toshiba, Tokyo, Japan

[21] Appl. No.: 130,416

[22] Filed: Oct. 1, 1993

Related U.S. Application Data

[63] Continuation of Ser. No. 650,993, Feb. 4, 1991, abandoned, which is a continuation of Ser. No. 388,755, Aug. 3, 1989, abandoned, which is a continuation of Ser. No. 844,611, Mar. 27, 1986, abandoned.

[30] Foreign Application Priority Data

Mar. 29, 1985 [JP] Japan .................. 60-63456

[51] Int. Cl.$^5$ ............................. G06F 15/38
[52] U.S. Cl. ............... 364/419.02; 345/123; 395/148
[58] Field of Search ............ 395/148, 153, 157, 161; 364/419.02, 419.03, 419.05, 419.06, 419.1; 345/119, 115, 123

[56] References Cited

U.S. PATENT DOCUMENTS

| | | | |
|---|---|---|---|
| 4,159,536 | 6/1979 | Kehoe et al. | 364/900 |
| 4,193,119 | 3/1980 | Arase et al. | 364/900 |
| 4,404,554 | 9/1983 | Tweedy, Jr. et al. | 340/750 |
| 4,412,305 | 10/1983 | Yoshida | 364/900 |
| 4,475,171 | 10/1984 | Kanou | 364/900 |
| 4,489,396 | 12/1984 | Hashimoto et al. | 364/900 |
| 4,502,128 | 2/1985 | Okajima et al. | 364/900 |
| 4,503,426 | 3/1985 | Mikulski | 364/900 |
| 4,542,478 | 9/1985 | Hashimoto et al. | 364/900 |
| 4,599,612 | 7/1986 | Kaji et al. | 364/419 |
| 4,641,264 | 2/1987 | Nitta et al. | 364/900 |
| 4,685,060 | 8/1987 | Yamano et al. | 364/419 |
| 4,734,036 | 3/1988 | Kasha | 434/157 |
| 4,774,666 | 9/1988 | Miyao et al. | 364/900 |
| 4,775,956 | 10/1988 | Kaji et al. | 364/419 |
| 4,791,587 | 12/1988 | Doi | 364/419 |

FOREIGN PATENT DOCUMENTS 0012777 7/1980 European Pat. Off.
0081784 6/1983 European Pat. Off.

OTHER PUBLICATIONS

European Office Action.
Patent Abstracts of Japan, vol. 9, No. 141 (P-364) [1864], Jun. 15, 1985 & JP-A-60 20 283 (Toshiba K.K.) Feb. 1, 1985.
Patent Abstracts of Japan, vol. 8, No. 214 (P-304) [1651], Sep. 29, 1984; & JP-A-59 95 672 (Toshiba K.K.) Jun. 1, 1984.

*Primary Examiner*—Rebecca L. Rudolph
*Attorney, Agent, or Firm*—Oblon, Spivak, McClelland, Maier & Neustadt

[57] ABSTRACT

A machine translation system includes a translation processor, a display, and a display controller. The display has original and translated sentence display sections. The display controller has a display managing section and a display format controller. The translation processor translates a given original sentence by accessing a dictionary. The translated and original sentences are displayed in the translated and original sentence display sections, i.e., right and left display sections of the display. The original and translated sentences are managed by the display magaging section in predetermined units of translation processing. The display format controller controls the original and translated sentences such that start lines of a given group thereof are horizontally aligned with each other.

4 Claims, 5 Drawing Sheets

FIG. 2

| | |
|---|---|
| I saw a girl with a bag on the right bank yesterday. | 私は昨日右土手でバックを持つ少女を見た。 |
| This morning I saw that girl on the same place again. | 今朝再び同じ場所でその少女を見た。 |
| I don't know her name and where she lives. | 私は彼女の名前や住んでいるところを知らない。 |

SA     SB     S

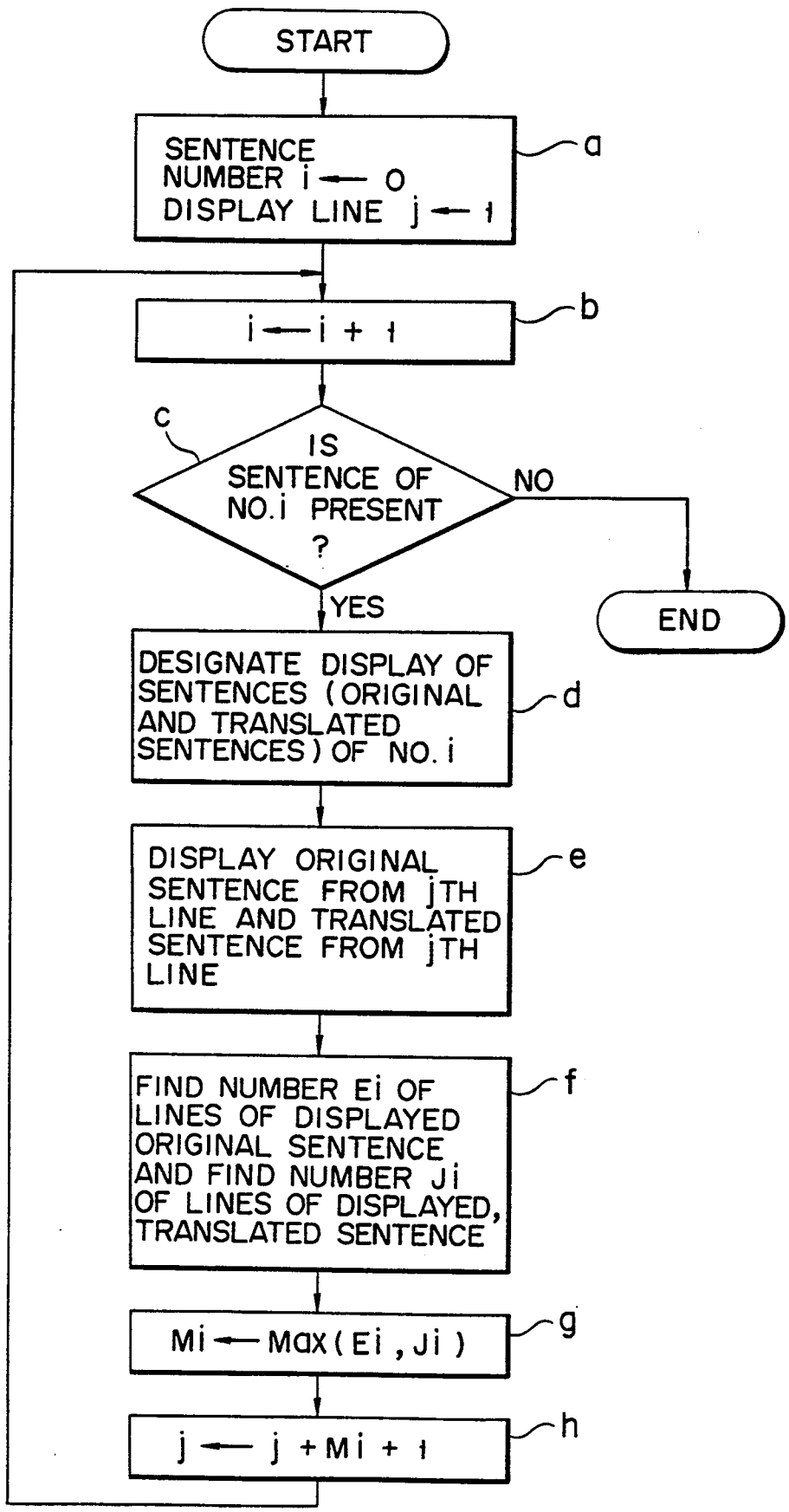

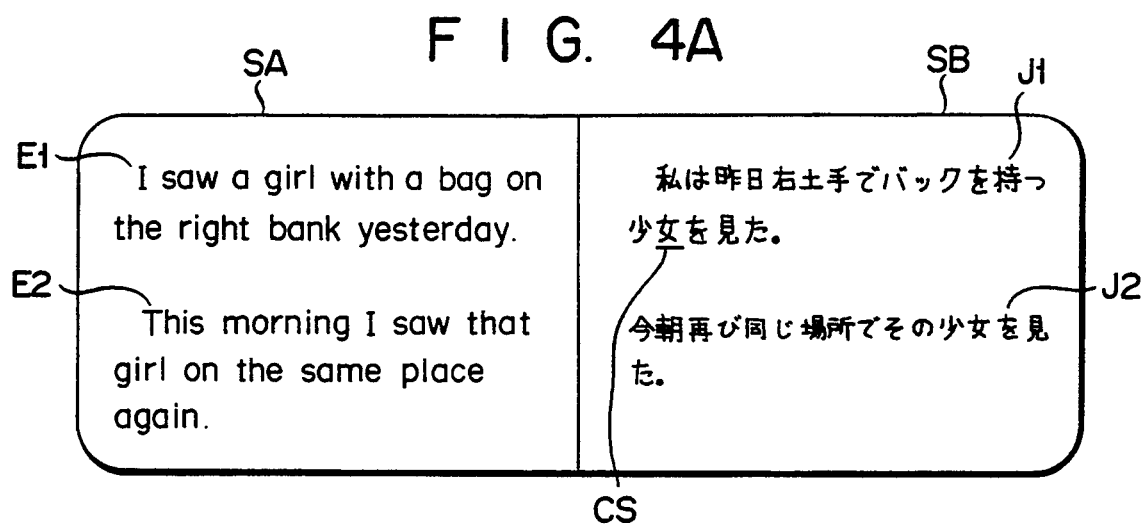
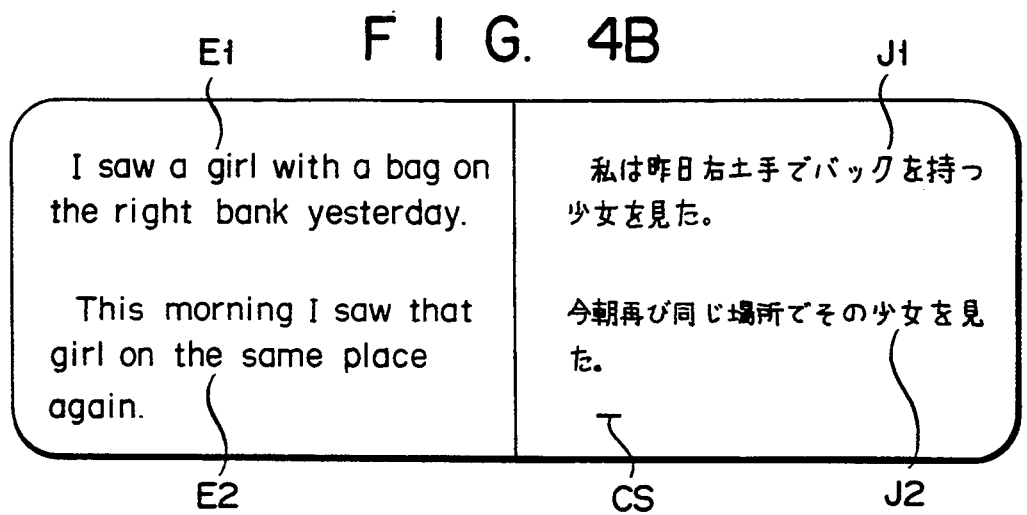
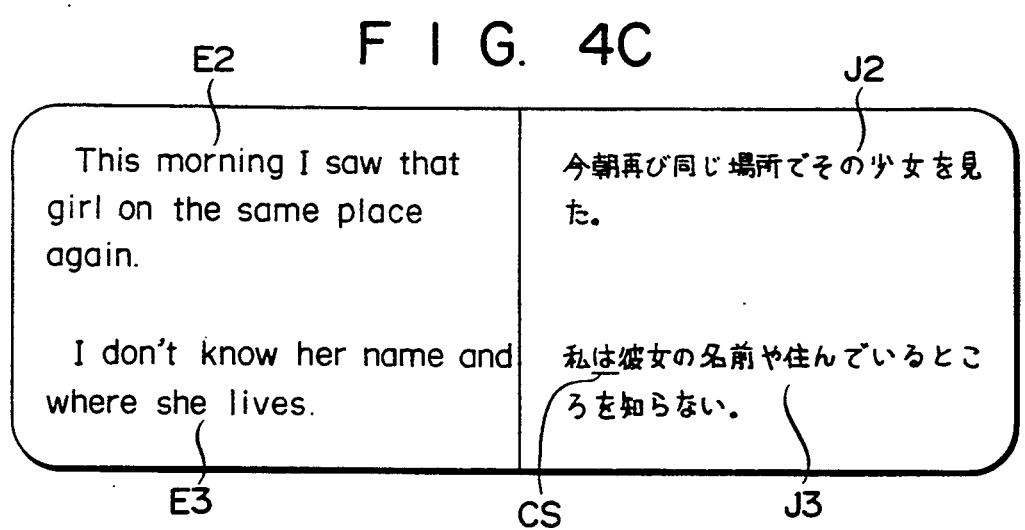

MACHINE TRANSLATION SYSTEM INCLUDING SEPARATED SIDE-BY-SIDE DISPLAY OF ORIGINAL AND CORRESPONDING TRANSLATED SENTENCES

This application is a continuation of application Ser. No. 07/650,993, filed on Feb. 4, 1991, now abandoned, which is a continuation of application Ser. No. 07/388,755, filed Aug. 3, 1989, now abandoned, which is a continuation of application Ser. No. 06/844,611, filed Mar. 27, 1986, now abandoned.

BACKGROUND OF THE INVENTION

The present invention relates to a machine translation system for processing a sentence of a language to translate it into a sentence of another language and, more particularly, to a machine translation system wherein the translated sentence is output together with the original sentence in one-to-one correspondence therewith, thereby simplifying operator inputs for translation processing.

Various types of computer-aided machine translation systems, e.g., a system for translating English sentences to Japanese sentences and vice versa, have been proposed in recent years. Each sentence of input original sentences is divided into words or phrases as processing units for syntactic analysis, and a translation dictionary is accessed for each word or phrase, retrieving a translated word or phrase. Finally, the translated words or phrases are combined into a translated sentence. When two or more translated sentences are obtained for the same original sentence, the original sentence is syntactically analyzed, and any translated sentence regarded as improper in accordance with the analysis results is eliminated.

After the improper translated sentences are eliminated, there still remains a variety of possible translated words or phrases for the translated sentence regarded as proper. More specifically, each original word or phrase often has different parts of speech, different meanings. In order to obtain appropriate equivalents to such an original word or phrase, the translated word or phrase must be selected in accordance with parts of speech and meaning. When a translated word or phrase corresponding to the original word or phrase is changed due to modification, the appropriate translated word or phrase must be selected. In this case, proper selection changes greatly in accordance with the contents of the sentence to be translated, and with the intention of an operator or translator (user), and thus cannot be solely determined. For this reason, the translated sentence is displayed on a display, and the operator selects translation possibilities for each word of the translated sentence, and the operator refers to the corresponding original sentence, thereby properly determining the translated sentence.

In the conventional system, the translated sentence and the original sentence are displayed on a display to allow the operator to compare them. In such a system, the screen is vertically or horizontally divided into halves, with original sentences displayed on one half and translated sentences displayed on the other half. In another conventional system, the original and translated sentences are alternately displayed on a single screen area.

In the system employing the divided screen format, all the original and translated sentences are displayed on corresponding screen areas, exactly in the same form as they have been input and provided. Therefore, it is difficult for the operator to recognize which original sentence corresponds to which translated sentence, making it hard to edit the original or translated sentences efficiently.

When a given translated word is to be corrected, the translator must refer to the corresponding part of the original sentence. In other words, the translator must find that portion of the original sentence which corresponds to the translated word by reading the original text in units of sentences or paragraphs. Therefore, when the corresponding original portion is at the central portion of the original document, or if the original sentence is very long, it will take him or her a long time to find the original portion corresponding to the translated word to be corrected.

In the system employing the latter screen format, the correspondence between the original sentence and the translated sentence is clear. However, the length of the original sentence may differ greatly from that of the translated sentence. This complicates display control. When the original and translated sentences are alternately displayed on the screen, it is inconvenient to read only one of the translated or original sentences at a time.

SUMMARY OF THE INVENTION

It is an object of the present invention to provide a machine translation system, wherein control is not complicated, and original and translated sentences can be output such that their correspondence can be readily recognized.

In order to achieve the above object of the present invention, there is provided a machine translation system comprising a translation processor for performing translating an original sentence by accessing a dictionary to produce a translated sentence corresponding to the original sentence, and an output device for outputting, e.g., displaying/printing the translated sentence produced by the translation processor and the original sentence, wherein the output device comprises a management section with original and translated sentence output regions as left and right output regions for displaying or printing the translated and original sentences in horizontal direction, the management section being arranged to manage the original and translated sentences in units of sentences, and an output control section for causing the output device to output the original and translated sentences managed by the managing section, so that a start line of the original sentence corresponds to a start line of the translated sentence and that a line space is inserted between each two adjacent original and translated sentences output at the left and right output regions.

According to the machine translation system of the present invention, the original and translated sentence output regions serve as the left and right output regions. The start line positions of the original and translated sentences correspond to each other. A line space is formed between each two adjacent ones of original and translated sentences. In other words, the original sentence is horizontally aligned with the corresponding translated sentence on the output surface to allow the operator to readily understand its correspondence. In addition, a line space is formed between each two adjacent sentences in each output region, so that the operator can readily distinguish a given sentence from an adjacent sentence.

The operator (translator) of this system can easily find on the output surface (e.g., a display screen) an original sentence portion corresponding to the translated sentence including a word or phrase to be corrected, or a translated sentence corresponding to the original sentence including the word or phrase to be corrected. The operator can easily correct the translated or original sentence. Thus, labor is saved on the part of the operator.

Since the sentences, as translation processing units, are managed so that the start line position of the original sentence is matched with that of the corresponding translated sentence and output control is simplified.

BRIEF DESCRIPTION OF THE DRAWINGS

FIG. 2 is a plan view of a screen showing display states of original and translated sentences;

FIG. 3 is a flow chart for explaining a display control sequence for displaying the original and translated sentences at corresponding positions, as shown in FIG. 2;

FIGS. 4A to 4C are plan views showing screen scroll states of the original and translated sentences of the system of FIG. 1.

DETAILED DESCRIPTION OF THE PREFERRED EMBODIMENT

Figure 1:
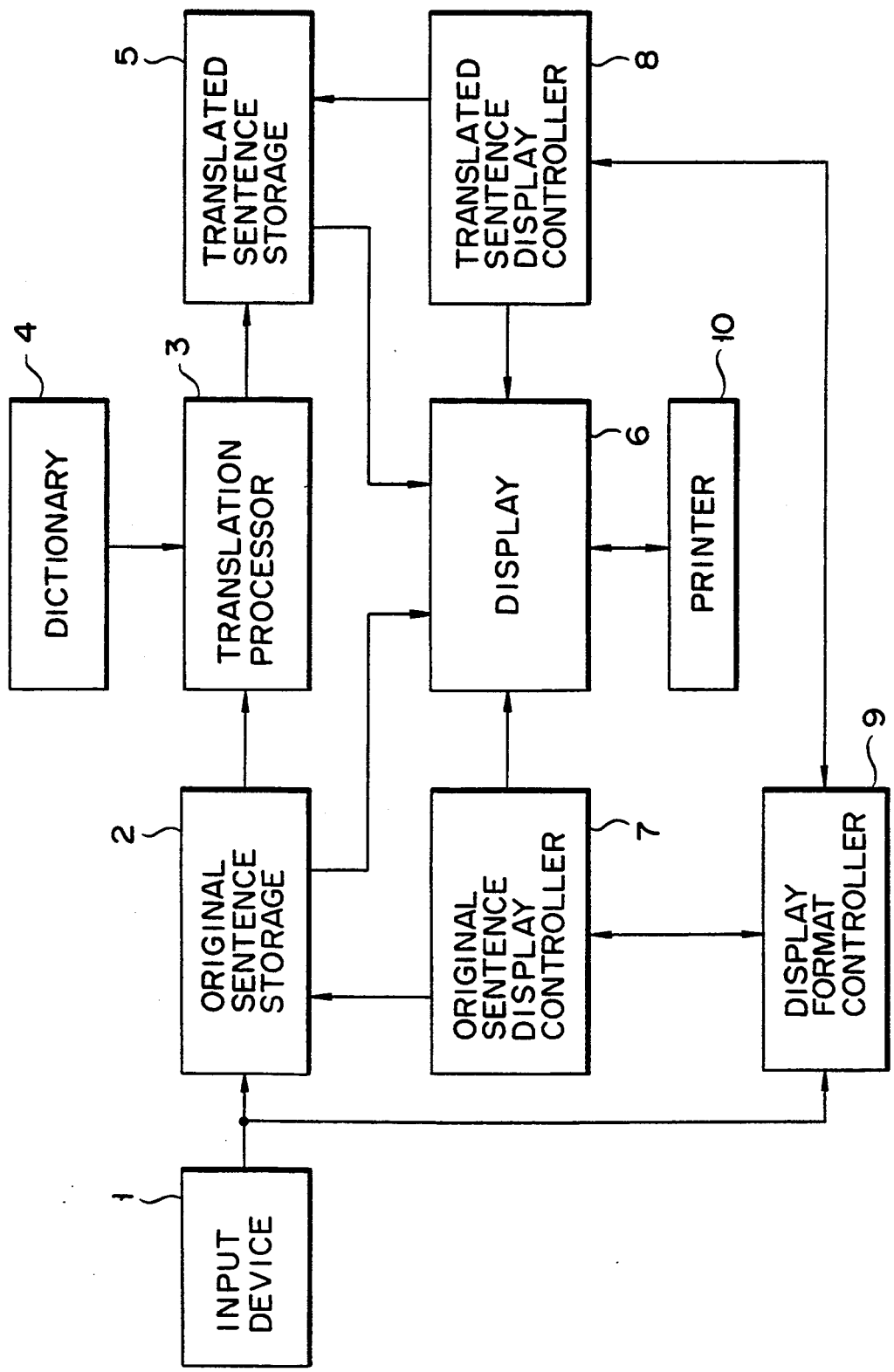
FIG. 1 is a block diagram showing a schematic configuration of a machine translation system according to an embodiment of the present invention.

FIG. 1 shows a schematic configuration of a machine translation system according to an embodiment of the present invention, and FIG. 2 shows a display state of original and translated sentences in the system of FIG. 1. In this embodiment, English sentences are input to the system and are processed and translated into Japanese sentences.

Original English sentences input at input device 1 are stored in original sentence storage 2. The original sentences are output from storage 2 in predetermined translation processing units, e.g., each sentence, and are sequentially supplied to translation processor 3. The original sentences may also be read out from storage 2 in units of paragraphs. Division of sentences is discriminated by detecting a full-stop or the like in the input character string. The divided single sentences are assigned with sentence numbers from 1 to n, and the input original sentences can be managed in accordance with the sentence numbers. Inputs to processor 3 are controlled by the sentence numbers.

Processor 3 divides each original sentence (i.e., a first sentence) into words or phrases, as syntactic analysis processing units. In doing so, the original sentence is divided into words by detecting blank spaces in the character string. Processor 3 accesses dictionary 4 to obtain translation possibilities for the original words. Dictionary 4 is a data base for storing translated words or phrases corresponding to the words or phrases of the original sentences. Processor 3 also performs syntactic analysis of the input original sentences. Processor 3 eliminates improper translation possibilities from among all possibilities in accordance with the syntactic analysis results, and produces translation possibilities for the original sentence with combinations of the remaining translation possibilities for the original words. Each original word usually has a plurality of translation possibilities according to the parts of speech, meaning, and modification. Therefore, a plurality of translation possibilities are prepared for the original sentence. These translation possibilities for the original sentence are stored together with selection data in translated sentence storage 5. In this case, the same sentence numbers as in the original sentences are assigned to the corresponding translation possibilities. The translation possibilities are thus managed in correspondence with the original sentences.

Display screen S of display 6 is divided into right and left screen regions by a so-called multiwindow function. The left region serves as original sentence display region SA, and the right region serves as translated sentence display region SB, as shown in FIG. 2. Display 6 is controlled by original and translated sentence display controllers 7 and 8. The original and translated sentences read out in units of sentences from storages 2 and 5 are displayed on regions SA and SB of display 6 from left to right. Display format controller 9 receives display control data input through device 1 and controls original and translated sentence readout operations of controllers 7 and 8 and hence the display formats of the original and translated sentences, managed as described above.

FIG. 3 is a flow chart for explaining a basic control sequence of display of the original and translated sentences under the control of controller 9.

In controller 9, display control parameters i and j are initialized to "0" and "1" to display the original and translated sentences (step a). Parameter i designates the sentence number, and parameter j designates a display line position of the character string data constituting a sentence. After initialization, parameter i is incremented by 1 (step b), and controller 9 checks in step c if sentences (the original and translated sentences) of the sentence number corresponding to the value of parameter i are present. When the sentences of sentence number i are detected as being stored in storages 2 and 5, respectively, the sentence display control signals are supplied to controllers 7 and 8 (step d).

Controllers 7 and 8 respectively read out the original and translated sentences of sentence number i from storages 2 and 5, respectively. The readout sentences are then supplied to display 6 and are displayed at display start lines of regions SA and SB which are represented by parameter j (step e). Numbers of display lines Ei and Ji of the original and translated sentences displayed in regions SA and SB are respectively detected by controllers 7 and 8 (step f). Controller 9 then calculates a larger number of display lines using data Ei and Ji as follows:

$$Mi \leftarrow \max(Ei, Ji)$$

Number Mi is the number of display lines necessary for displaying the original and translated sentences of sentence number i on display 6 (step g).

Subsequently, parameter j is updated (step h) using Mi as follows:

$$j \leftarrow j + Mi + 1$$

and the flow then returns to step b. In step b, parameter (sentence number) i is updated, and the next sentence display is controlled in the same manner as described above. In this case, parameter j can be updated to a number larger by one line than the number of display lines for the previous sentences, thereby forming at least one line space after the final display line of the previous sentences.

Thus, the input original sentences correspond to the translated sentences obtained by processing the original sentences in units of sentences as the translation processing units in processor 3, so that the start line positions of the original and translated sentences are aligned with each other on the screen and are respectively displayed in regions SA and SB. Furthermore, the original or translated sentences in each region SA or SB are separated by one line space between each sentence.

Therefore, when the translator or operator wants to correct the displayed translated sentence candidate, he can easily recognize the correspondence between the translated sentence portion to be corrected and the corresponding original sentence portion, thereby simplifying correction. Since display control is simple, as described above, control load of the system is decreased.

The possible number of display lines in display 6 tends to be small as compared with all the sentences to be processed, and therefore, all the sentences cannot be simultaneously displayed on screens. In this case, only some of the sentences are selectively displayed on the screen. When the sentences managed in units of sentences and displayed on display 6 are edited, the original and translated sentences must be scrolled to display the subsequent sentences.

In this case, the translated and original sentences are simultaneously scrolled in regions SA and SB to maintain the correspondence therebetween. When an original sentence is compared with a translated sentence in the machine translation system of this invention, corresponding portions of the original and translated sentences must often be displayed as entire sentences to allow comparison therebetween. Therefore, in this system, the scroll control of the display screen is performed in units of sentences.

As shown in FIG. 4A, English sentences E1 and E2 as original sentences are displayed in region SA, and corresponding Japanese sentences J1 and J2 are displayed in region SB. In this case, cursor CS is located at the second character position off the second line off sentence J1. When the operator moves the cursor downward on the display screen, the cursor is located on the lowermost line (second character position), as shown in FIG. 4B. In this state, when the operator moves the cursor downward on the screen, the display contents are scrolled in units off sentences. Therefore, as shown in FIG. 4C, original sentence E3 and corresponding translated sentence J3 appear at the lower ends of regions SA and SB, and sentence E1 and J1 displayed at the upper ends of regions SA and SB shown in FIGS. 4A and 4B disappear from regions SA and SB. Therefore, sentences E2 and E3 are displayed in region SA, and sentences J2 and J3 respectively corresponding to sentences E2 and E3 are displayed in region SB.

Figure 5:
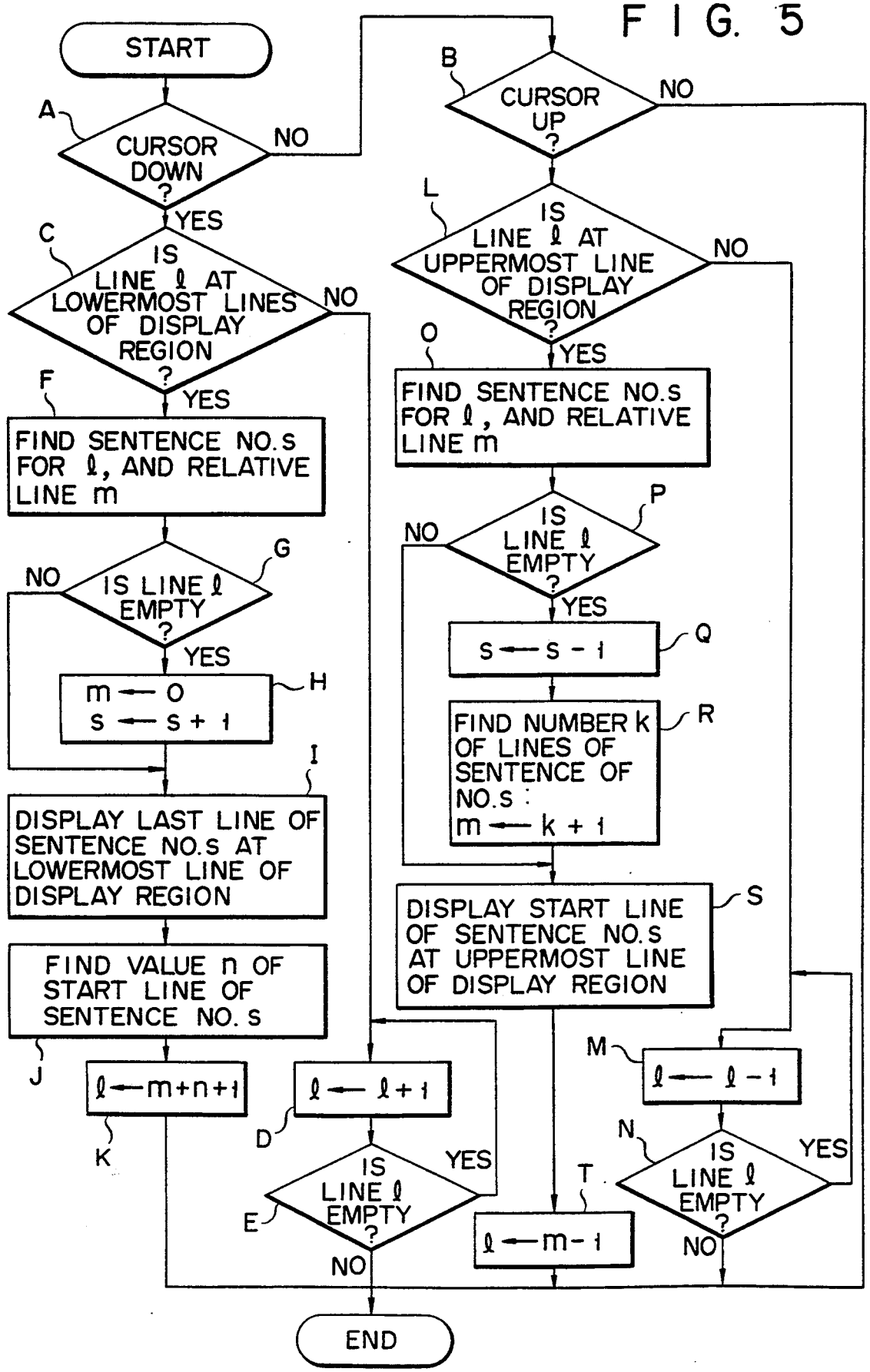
FIG. 5 is a flow chart for explaining a scroll control sequence for scrolling the screen of the original and translated sentences shown in FIGS. 4A to 4C.

FIG. 5 is a flow chart for explaining a scroll control sequence accompanying cursor shifting.

Input data entered upon operation of a predetermined key on a keyboard (not shown) is determined to indicate a cursor-down (the cursor is moved downward) command (step A) or a cursor-up (the cursor is moved upward) command (step B).

When the cursor-down command is entered, it is checked if line l designated by the cursor on the screen is on the lowermost line of regions SA and SB (step C). If the cursor-located line is not the lowermost line, as shown in FIG. 4A, line l is incremented by 1 (step D). If the updated line l represents line spacing, line l is continuously incremented (steps D and E). When the display start line position of a given sentence is designated by the cursor, the cursor-down operation is performed, and the system waits for the next command. The operator (user) judges if the sentence designated by the cursor on the display screen is to be edited.

As shown in FIG. 4B, when the cursor designated line l is determined in step C to be the lowermost line of the display region, sentences following the lowermost line of the regions SA and SB are to be displayed. Sentence number s of sentences displayed on line l and relative line (line position from the start line of the sentence) m are then calculated (step F). It is determined if updated line l represents line spacing (step G). If YES in step G, m is initialized to "0" and, at the same time, s is incremented by one (step H), thus confirming that the sentences to be displayed are those of the next sentence number. However, if NO in step G, all sentences represented by sentence number s must be displayed.

When this processing is completed, all the display contents are scrolled so that the last lines of the sentences of sentence number s are located on the lowermost lines of regions SA and SB (step I). Upon scrolling, the entire sentences of sentence number s are displayed at the lower positions of regions SA and SB. Start line display position (display line) of sentences of sentence number s displayed at the lower positions of regions SA and SB is calculated (step J), and line (line of interest) l designated by the cursor is updated (step K) as follows:

$$l \leftarrow m + n + 1$$

In the processing of step K, the cursor designates an identical character position of the line next to the line designated by the cursor prior to scrolling, as shown in FIG. 4C.

However, when a cursor-up command is generated, processing (steps L to T) resembling those from step C to step K is performed.

In step L, it is checked if cursor designated line l is on the uppermost line of regions SA and SB. If NO in step L, line l is decremented by one. In this case, if updated line l represents line spacing, line l is continuously decremented (steps M and N). When the uppermost display line is designated by the cursor, cursor-up operation is ended.

If YES in step L, the sentences prior to the uppermost line of the regions SA and SB are to be displayed. Sentence number s of the sentences displayed on line l and relative line (the line position from the start line of the sentence) m are calculated. It is determined if line l represents line spacing (step P). If YES in step P, sentence number s is decremented (step Q), and the sentences to be displayed are the ones of the immediately preceding sentence number. Line number K represented by sentence number s is calculated, and parameter (number of lines) m is updated (step R) as follows:

$$m \leftarrow k + 1$$

This operation indicates that a value obtained by adding one line space to the number of lines off sentence number s is necessary for displaying the sentence of number s while the display format is kept unchanged. However, if NO in step P, the entire sentence off number s must be displayed.

After this processing is completed, all the display contents are scrolled so that the start lines off number s are located on the uppermost lines of regions SA and SB (step S). Thus, the entire sentences of number s are displayed at the upper positions of regions SA and SB. Line (line of interest) l displayed by the cursor is updated (step T) as follows, with respect to the sentences of number s displayed at the upper positions of regions SA and SB:

$$l \leftarrow m - 1$$

In the processing of step T, the cursor designates the identical character position of the line corresponding to the immediately preceding line designated by the cursor prior to scrolling.

Screen scrolling need not be limited to control using cursor shift commands. For example, a scroll key or the like may be used to perform the same scrolling in units of translation processing as with the cursor shift commands. In this case, sentences to be displayed on the screen are preferably displayed entirely.

When the above processing is performed for original and translated sentences, these sentences can be managed in units of translation processing. At the same time, each two adjacent original or translated sentences are separated by line spacing and are displayed in the corresponding output region of the display. When the number of display lines of the translated sentence is different from that of the original sentence, line spaces are inserted after the sentence with a smaller number of display lines, thereby aligning the start lines of the subsequent original and translated sentences. In this manner, line spaces are used to separate each two adjacent sentences and to adjust the line number, thereby simplifying display control for the following reason: the line space can normally be entered by inputting carriage return and line feed characters.

The display contents of display 6 can be printed out at printer 10 as needed. When both the original and translated sentences are to be printed and the same printing format as that of display 6 is used, printer outputs can be visually recognized with ease. In addition, original or translated sentences can be printed separately at printer 10.

According to this system, the translated sentences produced by processor 3 and their corresponding original sentences are displayed in units off processing, i.e., sentences with one-to-one correspondence. The operator can perform translation and editing while clearly understanding the correspondence between the original and translated sentences. Therefore, the operator load in editing can be greatly decreased.

The present invention is not limited to the particular embodiment described above.

For example, translation is not limited from English to Japanese, but can be extended to other languages. Display control algorithms can be modified in accordance with system specifications (e.g., hardware and software configurations). The number of line spaces used as separation marks off sentences can be arbitrarily selected. Alternatively, a line consisting of other symbols or the like can be inserted as the separation line. Various changes and modifications may be made without departing from the spirit and scope of the invention.

What is claimed is:

1. A machine translation apparatus comprising:
translation means for translating an original sentence, using a translation dictionary;
display means having left and right screen sections, one serving as an original sentence display region for displaying the original sentence, and the other as a translated sentence display region for displaying a translated sentence;
control means for controlling said display means to display the translated sentence and the original sentence corresponding to the translated sentence in juxtaposition on said translated sentence display region and said original sentence display region with the first lines of said translated sentence and said original sentence being horizontally aligned to each other so as to correspond to each other for each unit of sentence; and
scroll means including scroll designating means for designating a scrolling mode in which said original sentence and said translated sentence which are displayed on said original sentence display region and said translated sentence display region, respectively, are scrolled downwards;
wherein, when said scrolling mode is designated by said scroll designating means, if a line of each of the original sentence and the translated sentence which is other than the first line thereof, is displayed on the uppermost line of each of said original sentence display region and said translated sentence display region, said scroll means scrolls said original sentence and said translated sentence in association with each other until the first lines are displayed on the uppermost lines of said original sentence display region and said translated sentence display region.

2. A machine translation apparatus comprising:
translation means for translating an original sentence, using a translation dictionary;
display means having right and left screen sections, one serving as an original sentence display region for displaying the original sentence, and the other as a translated sentence display region for displaying a translated sentence;
control means for controlling said display means to display the translated sentence and the original sentence, corresponding to the translated sentence, in juxtaposition on said translated sentence display region and said original sentence display region with the first lines of said translated sentence and said original sentence being horizontally aligned to each other so as to correspond to each other for each unit of sentence; and
scroll means including scroll designating means for designating a scrolling mode in which said original sentence and said translated sentence, which are displayed on said original sentence display region and said translated sentence display region, respectively, are scrolled downwards;
wherein, when said scrolling mode is designated by said scroll designating means, if the first line of each of the original sentence and the translated sentence is displayed on the uppermost line of each of said original sentence display region and said translated sentence, said scroll means scrolls said original sentence and said translated sentence in association with each other until the first line of the previous sentence is displayed on the uppermost line of each of said original sentence display region and said translated sentence display region.

3. A machine translation apparatus comprising:

translation means for translating an original sentence, using a translation dictionary;

display means having right and left screen sections, one serving as an original sentence display region for displaying the original sentence, and the other as a translated sentence display region for displaying a translated sentence;

control means for controlling said display means to display the translated sentence and the original sentence, corresponding to the translated sentence, in juxtaposition on said translated sentence display region and said original sentence display region with the first lines of said translated sentence and said original sentence being horizontally aligned to each other so as to correspond to each other for each unit of sentence; and scroll means including scroll designating means for designating a scrolling mode at which said original sentence and said translated sentence which are displayed on said original sentence display region and said translated sentence display region, respectively, are scrolled upwards;

wherein, when said scrolling mode is designated by said scroll designating means, if a line of each of the original sentence and the translated sentence which is other than the first line thereof, is displayed on the lowermost line of each of said original sentence display region and said translated sentence display region, said scroll means scrolls said original sentence and said translated sentence in association with each other until the lowermost line of one of said original sentence and said translated sentence which has more lines than the other coincides with the lowermost line of the corresponding one of said original sentence display region and said translated sentence display region.

4. A machine translation apparatus comprising:

translation means for translating an original sentence, using a translation dictionary;

display means having two screen section divided on the left and right, one serving as an original sentence display region for displaying the original sentence, and the other as a translated sentence display region for displaying a translated sentence;

control means for controlling said display means to display the translated sentence and the original sentence, corresponding to the translated sentence, in juxtaposition on said translated sentence display region and said original sentence display region with the first lines of said translated sentence and said original sentence being horizontally aligned to each other so as to correspond to each other for each unit of sentence; and scroll means including scroll designating means for designating a scrolling mode in which said original sentence and said translated sentence which are displayed on said original sentence display region and said translated sentence display region, respectively, are scrolled upwards;

wherein, when said scrolling mode is designated by said scroll designating means, if the lowermost line of each of the original sentence and the translated sentence is displayed on the lowermost line of each of said original sentence display region and said translated sentence display region and following original and translated sentences exist after said original sentence and said translated sentence, said scroll means scrolls said original sentence and said translated sentence in association with each other until the lowermost line of one of said following original and translated sentences which has more lines than the other coincides with the lowermost line of the corresponding one of said original sentence display region and said translated sentence display region.

* * * * *